(12) United States Patent
Saeki

(10) Patent No.: US 11,104,396 B2
(45) Date of Patent: Aug. 31, 2021

(54) VEHICLE

(71) Applicant: KAWASAKI JUKOGYO KABUSHIKI KAISHA, Kobe (JP)

(72) Inventor: Daisuke Saeki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/819,923

(22) Filed: Mar. 16, 2020

(65) Prior Publication Data
US 2020/0298922 A1  Sep. 24, 2020

(30) Foreign Application Priority Data

Mar. 19, 2019 (JP) .............................. JP2019-050881

(51) Int. Cl.
*B62J 6/16* (2020.01)
*B62J 6/024* (2020.01)
*B62J 6/025* (2020.01)

(52) U.S. Cl.
CPC .................. *B62J 6/16* (2013.01); *B62J 6/024* (2020.02); *B62J 6/025* (2020.02)

(58) Field of Classification Search
CPC ...... B60Q 1/18; B60Q 1/1423; B60Q 1/0041; B60Q 1/0683; B60Q 2300/136; B62J 6/16; B62J 6/025; B62J 6/024
USPC ....................................................... 362/475
See application file for complete search history.

(56) References Cited

U.S. PATENT DOCUMENTS

| | | | |
|---|---|---|---|
| 6,459,387 B1* | 10/2002 | Kobayashi | B60Q 1/085 340/988 |
| 2013/0294100 A1* | 11/2013 | Ishizaki | B60Q 1/143 362/465 |
| 2016/0311444 A1* | 10/2016 | Oshima | B60W 10/20 |

FOREIGN PATENT DOCUMENTS

| | | |
|---|---|---|
| DE | 20 2014 007 437 U1 | 4/2015 |
| JP | 2016-74246 | 5/2016 |

OTHER PUBLICATIONS

Busch & Müller KG, "IXON Core. Battery-powered LED highlight with IQ2 light technology", Instruction Manual, 2013, 2 sheets.

* cited by examiner

*Primary Examiner* — Andrew J Coughlin
*Assistant Examiner* — Jessica M Apenteng
(74) *Attorney, Agent, or Firm* — Fay Kaplun & Marcin, LLP

(57) ABSTRACT

A motorcycle includes a handle bar, a light operation part, and a control unit. The part is provided to the bar for operating light switching and passing operations. The light switching operation is an operation for switching between irradiating low beam and irradiating high beam of a headlight in a manual mode. The unit performs at least two modes among the manual mode, a first auto mode which is a mode for automatically switching between the low beam and the high beam, and a second auto mode which is a mode for automatically adjusting an irradiation area of the high beam. The unit switches the modes including at least two modes among the manual mode, the first auto mode, and the second auto mode when determining that a mode switching operation which is different from the light switching operation and the passing operation is performed using the part.

12 Claims, 11 Drawing Sheets

Fig. 4
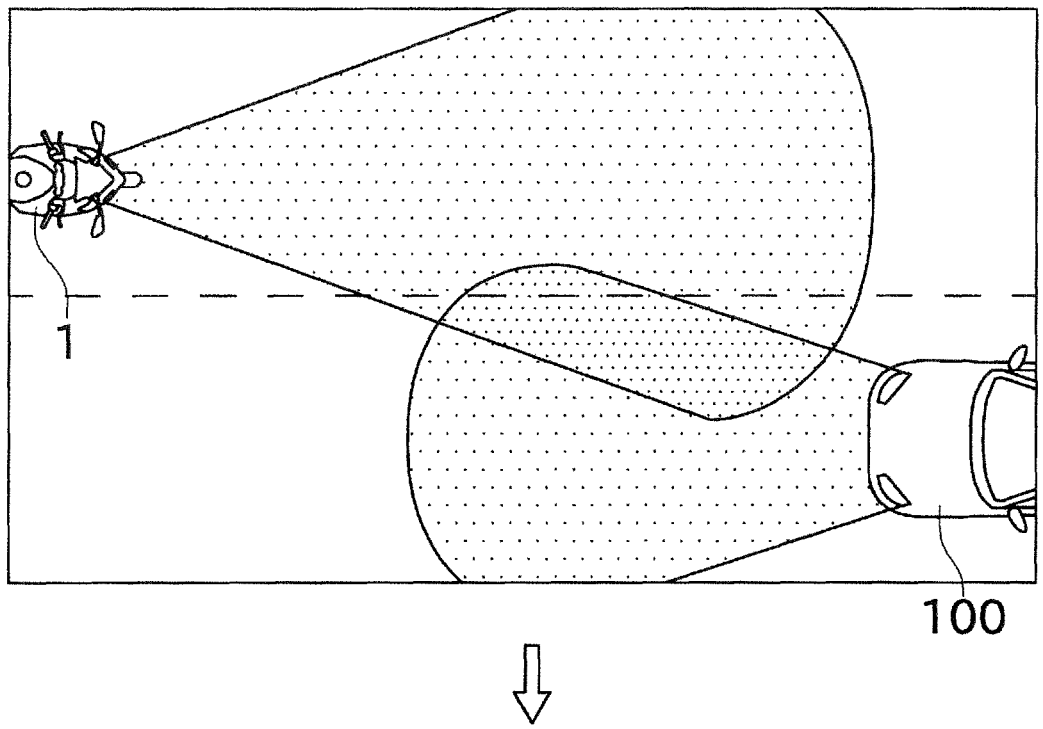
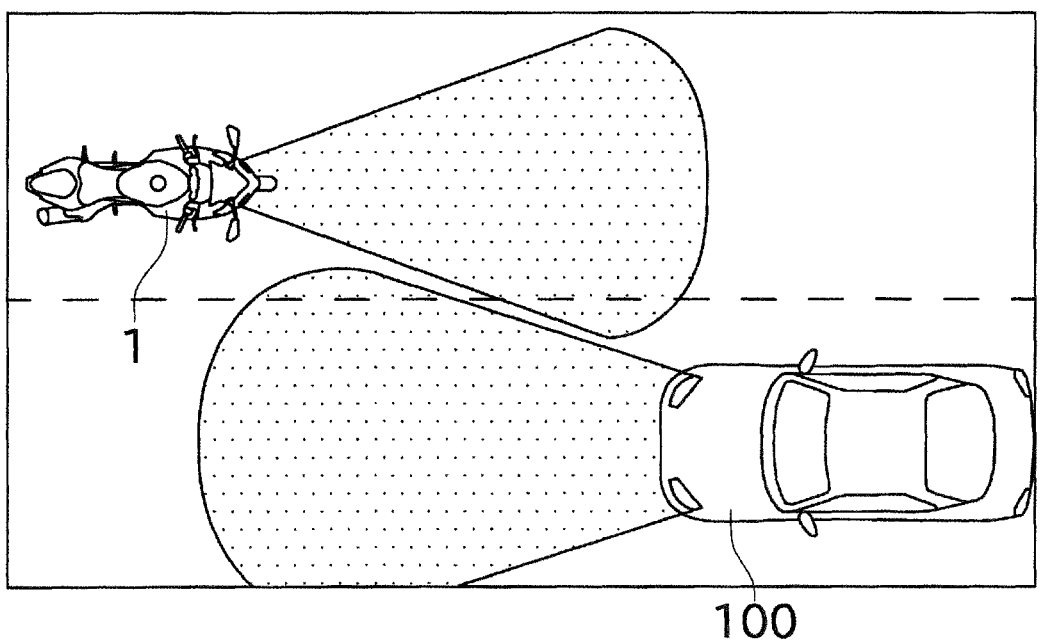

Fig. 5
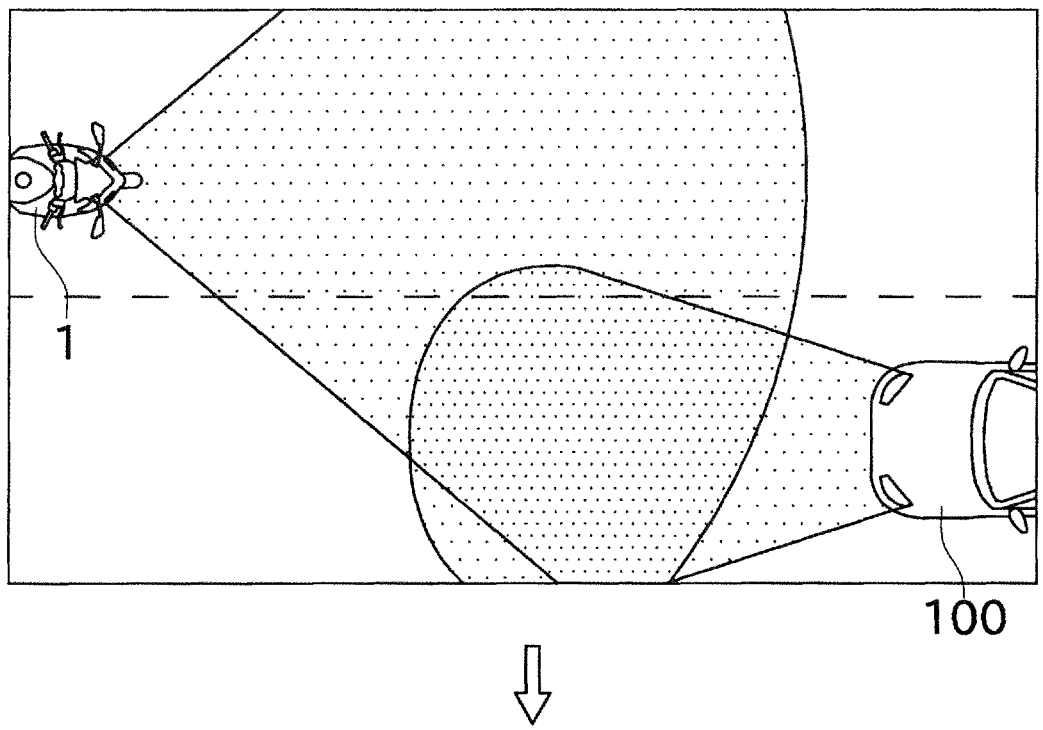
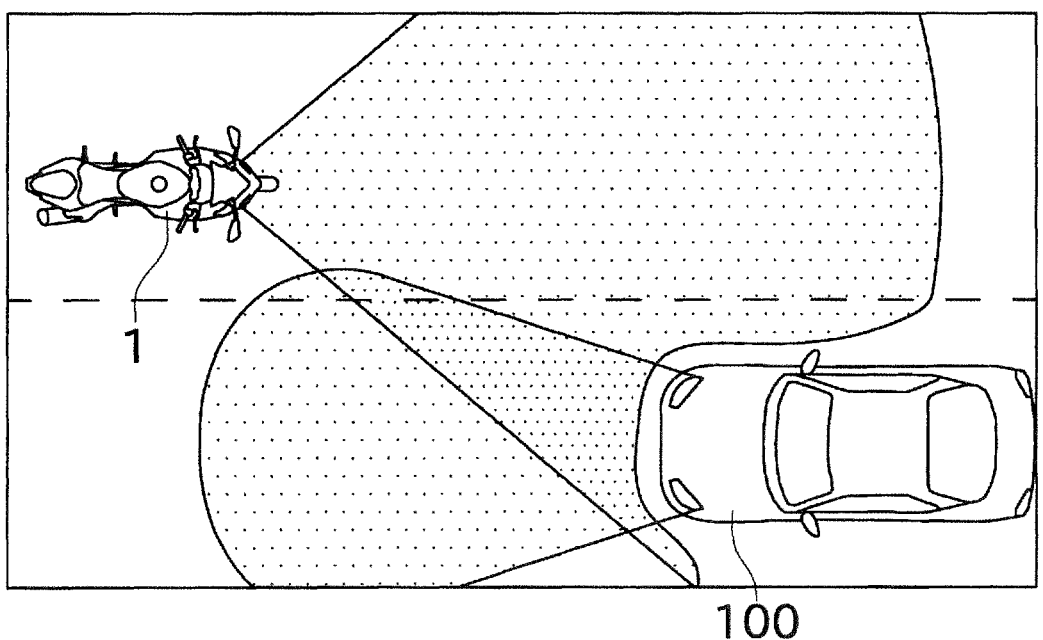

Fig. 7

| first short operation (light switching operation) | { manual mode (low beam)<br>first auto mode<br>second auto mode } ⇒ manual mode (high beam) |
|---|---|
| second operation (light switching operation) | { manual mode (high beam)<br>first auto mode<br>second auto mode } ⇒ manual mode (low beam) |
| first long operation (mode switching operation) | manual mode ⇒ first auto mode<br>↖ ↗<br>second auto mode |
| passing operation | high beam during positioning at position P2 | manual mode: validity
first auto mode: validity
second auto mode: validity

Fig. 9

| first short operation (light switching operation) | { manual mode (low beam)<br>  second auto mode  ⇒ manual mode (high beam) |
|---|---|
| second operation (light switching operation) | { manual mode (high beam)<br>  second auto mode  ⇒ manual mode (low beam) |
| first long operation (mode switching operation) | (a)  manual mode ⇔ second auto mode<br>       or<br>(b) { manual mode<br>      second auto mode  ⇒ second auto mode |
| passing operation | high beam during positioning at position P2 | manual mode: validity
first auto mode: invalidity
second auto mode: validity

VEHICLE

FIELD

The present disclosure relates primarily to a vehicle comprising a handle bar.

DESCRIPTION OF THE RELATED ART

Japanese Patent Application Laid-Open Serial No. JP2016-74246 (hereinafter, referred to as PTL 1) discloses a handle switch device provided in a handle bar type vehicle.

When a driver performs predetermined operations on the handle switch device described in PTL 1 a state of irradiating high beam of a headlight and a state of irradiating low beam are switched.

SUMMARY

PTL 1 discloses only a mode in which the driver manually switches the high beam and the low beam of the headlight. PTL 1 does not disclose other modes relating to the illumination of the headlight.

The present disclosure relates to a vehicle having a handle and a configuration in which a mode related to a headlight irradiation can be switched without introducing a dedicated operation element for switching the mode.

An aspect of the present invention provides a vehicle configured as follows. That is, the vehicle includes a handle bar, a light operation part, and a control unit. The light operation part is provided to the handle bar. During a manual mode of manually switching between low beam and high beam of a headlight, the light switching operation for switching between irradiating the low beam or irradiating the high beam can be performed using the light operation part.

A passing operation for temporarily switching the low beam to the high beam may be performed using the light operation part. The control unit performs at least two modes among the manual mode, a first auto mode which is a mode for automatically switching between the low beam and the high beam, and a second auto mode which is a mode for automatically adjusting an irradiation area of the high beam. The control unit switches the modes including at least two modes among the manual mode, the first auto mode, and the second auto mode when the control unit determines that a mode switching operation which is different from the light switching operation and the passing operation is performed using the light operation part.

Accordingly, modes related to the irradiation of the headlight can be switched by using the light operation part. Therefore, compared with a configuration in which an operation element for switching modes is separately provided, the number of the operation elements arranged in the handle bar can be reduced. In particular, since the vehicle including the handle bar has a limited space for disposing the operation element, the above-mentioned effects can be more effectively exhibited.

An embodiment of the present disclosure may provide a vehicle having a handle and a configuration in which a mode related to a headlight irradiation can be switched without introducing a dedicated operation element for switching the mode.

BRIEF DESCRIPTION OF THE DRAWINGS

FIG. 4 is a view schematically showing a process performed in a first auto mode.

FIG. 5 is a view schematically showing a process performed in a second auto mode.

FIG. 7 is a table describing how three valid modes are switched.

FIG. 9 is a table describing how two valid modes are switched.

DETAILED DESCRIPTION

Hereinafter, an embodiment of the present disclosure will be described with reference to the drawings. In descriptions below, the left-right direction and front-rear direction of the motorcycle 1 are defined based on the view from a rider riding on the motorcycle (vehicle, straddle vehicle) 1. Therefore, the front-rear direction coincides with a vehicle length direction. The left-right directions coincide with a vehicle width direction. The vertical direction (up-down direction) coincides with a height direction.

Figure 1:
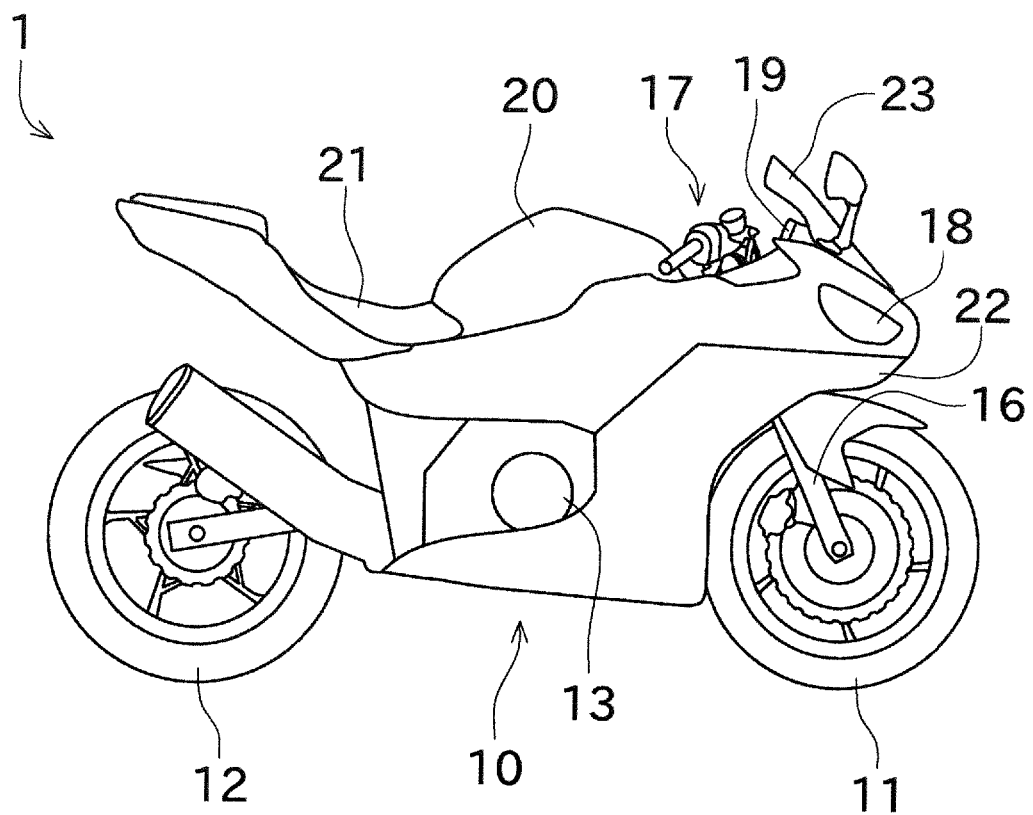
FIG. 1 is a side view of a motorcycle according to a first embodiment.
Figure 2:
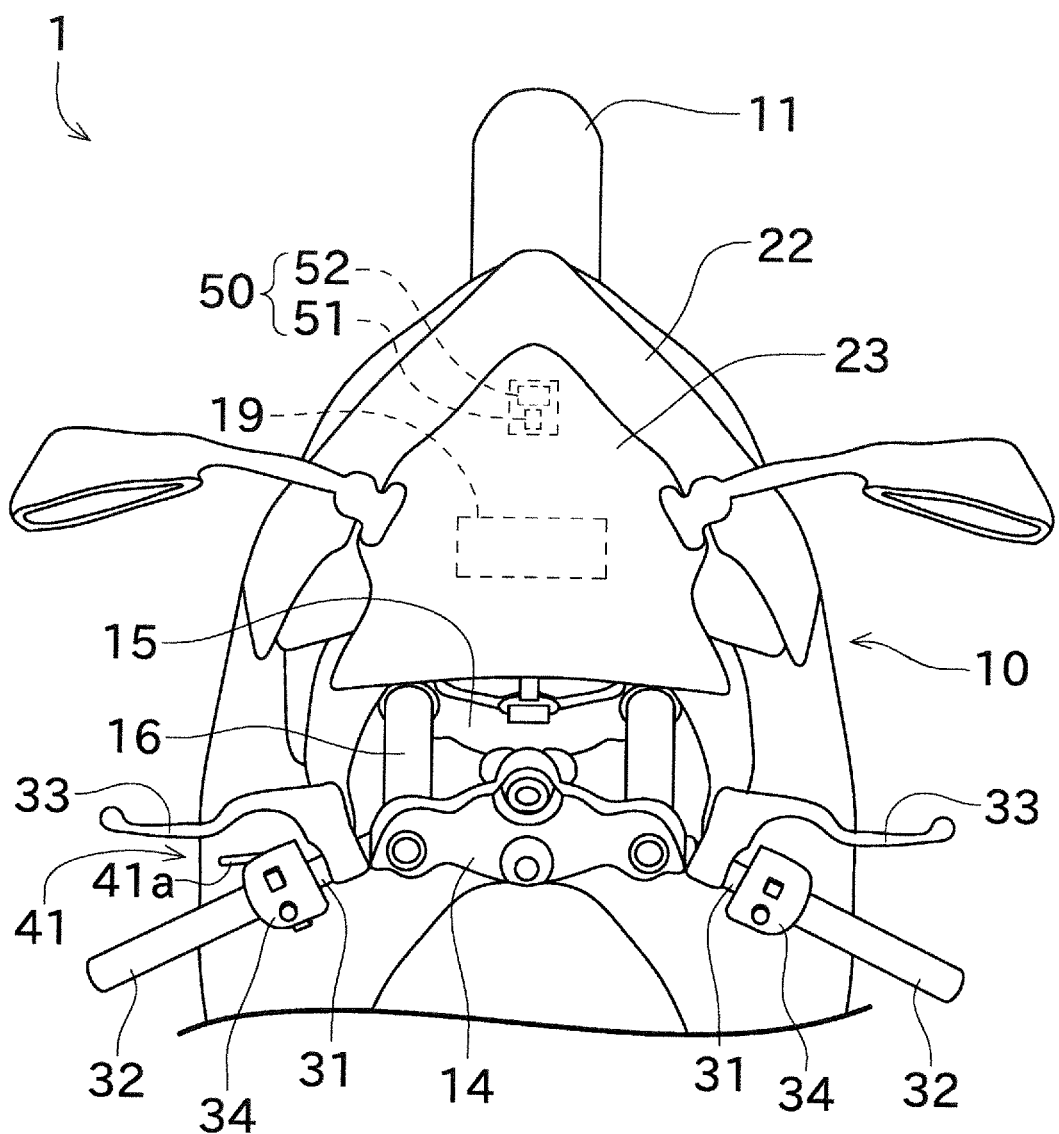
FIG. 2 is a plan view of a front part of the motorcycle.

First, the outline of the motorcycle 1 of the first embodiment will be described referring to FIGS. 1 and 2. FIG. 1 is the side view of the motorcycle 1. FIG. 2 is the plan view of the front part of the motorcycle 1. As shown in FIG. 1, the motorcycle 1 includes a vehicle body 10, a front wheel 11, and a rear wheel 12.

The vehicle body 10 includes a plurality of the vehicle body frames serving as a framework of the motorcycle 1. Various components constituting the motorcycle 1 are attached to these body frames. An engine 13 is provided in vicinity of a center in the vehicle length direction of the vehicle body 10. The engine 13 is a drive source for driving the motorcycle 1. The engine 13 of this embodiment is a gasoline engine. Instead of or in addition to the gasoline engine, another driving source, for example, an electric motor for traveling may be provided. The power generated by the engine 13 is transmitted to the rear wheel 12 via a drive chain (not shown). This makes it possible to drive the motorcycle 1.

A front fork 16 is attached to the vehicle body frame via a upper bracket 14, a lower bracket 15, and the like. The front fork 16 is disposed in a pair of left and right so as to sandwich the front wheel 11 when viewed from the front. A handle unit 17 is disposed near an upper end of front fork 16. The rotation of the handle unit 17 by a driver make the front fork 16 rotates. As a result, a traveling directions of the motorcycle 1 can be changed.

The handle unit 17 comprises a handle bar 31. The handle bar 31 is attached to at least one of the upper bracket 14 and the front fork 16. In this embodiment, the two handle bars 31 are disposed separately on left and right. Alternatively, a single handle bar 31 may be used, which is arranged so as to extend from one side to the other side of the left-right direction (to intersect the vehicle width-direction center).

Each handle bar 31 is provided with a grip 32, a lever 33 and a handle switch 34. The grip 32 of the right side is a rotation type throttle grip. The lever 33 of the left side is a clutch lever, and the lever 33 of the right side is a brake lever. The handle switch 34 of the left side is provided with a light operation part 41. The light operation part 41 is a component for performing operations related to irradiation of the headlight 18. More specifically, the light operation part 41 is a component for performing both operations of switching high beam and low beam of the headlight 18 and passing operation for passing. In this embodiment, the light operation part 41 is composed of only return lever 41a (operation element), but may be composed of a plurality of the operation element as shown in the third embodiment described later.

The handle switch 34 of the left side may further include a turn signal lamp operation part for operating a turn signal lamp, a horn operation part for operating a horn, a hazard lamp operation part for simultaneously irradiating the left and right turn signal lamps, and the like. The handle switch 34 of the right side may be provided with, for example, an engine start operation part for starting the engine, a multi-function operation part to which a function can be assigned by the driver, or the like.

The headlight 18 for irradiating light in the forward direction is disposed at the front end of the vehicle body 10. A light source of the headlight 18 is, for example, an incandescent lamp, a halogen lamp, a HID (High-Intensity Discharge) lamp, and a light emitting diode (LED). For example, the headlight 18 may be disposed separately on the right and left sides. The Headlight 18 may be disposed only in the vehicle widthwise central portion. The Headlight 18 is configured to be switchable between a state of irradiating the low beam and a state of irradiating the high beam. The Headlight 18 may be capable of irradiating the low beam and the high beam using a common light source. Alternatively, the Headlight 18 may include a light source dedicated to the low beam and a light source dedicated to the high beam.

A meter device (setting operation part) 19 is disposed in front of the handle unit 17 and is near the center of the vehicle. The meter device 19 can display information about the motorcycle 1, such as engine speed, vehicle speed, and warnings. The meter device 19 is provided with keys or a touch panel (not shown). Various settings of the meter device 19 can be changed by operating them.

A fuel tank 20 for storing fuel to be supplied to the engine 13 is disposed behind the handle unit 17 and above the engine 13. A front seat 21 for driver to seat across is disposed behind the fuel tank 20. The driver stabilizes the body by sandwiching the fuel tank 20 and below it with the knees of the legs while seated in the front seat 21. Further, the driver moves the center of gravity to the left side or the right side to perform a part of a steering operation or a vehicle body tilting operation.

A cowling 22 is disposed on the outer surface of the motorcycle 1. The cowling 22 is provided for the purposes of reducing air-resistance of the motorcycle 1, protecting components of the motorcycle 1, and improving appearance of the motorcycle 1. The cowling 22 of this embodiment covers the front of the motorcycle 1 (e.g., around the headlight 18) and covers a portion of the side surface of the motorcycle 1. The shape of the cowling 22 shown in FIG. 1 is an example, and the position where the cowling 22 is disposed and the shape of the cowling 22 may differ from the example shown in FIG. 1.

A wind shield 23 is disposed in front of the handle unit 17. The wind shield 23 is disposed so as to extend obliquely backward and upward from the lower end (the base end). With this configuration, the wind shield 23 guides the running wind, thereby making it difficult for the running wind to hit driver. The wind shield 23 is transparent or translucent and can transmit visible light in order to secure the field of view of the driver.

Figure 3:
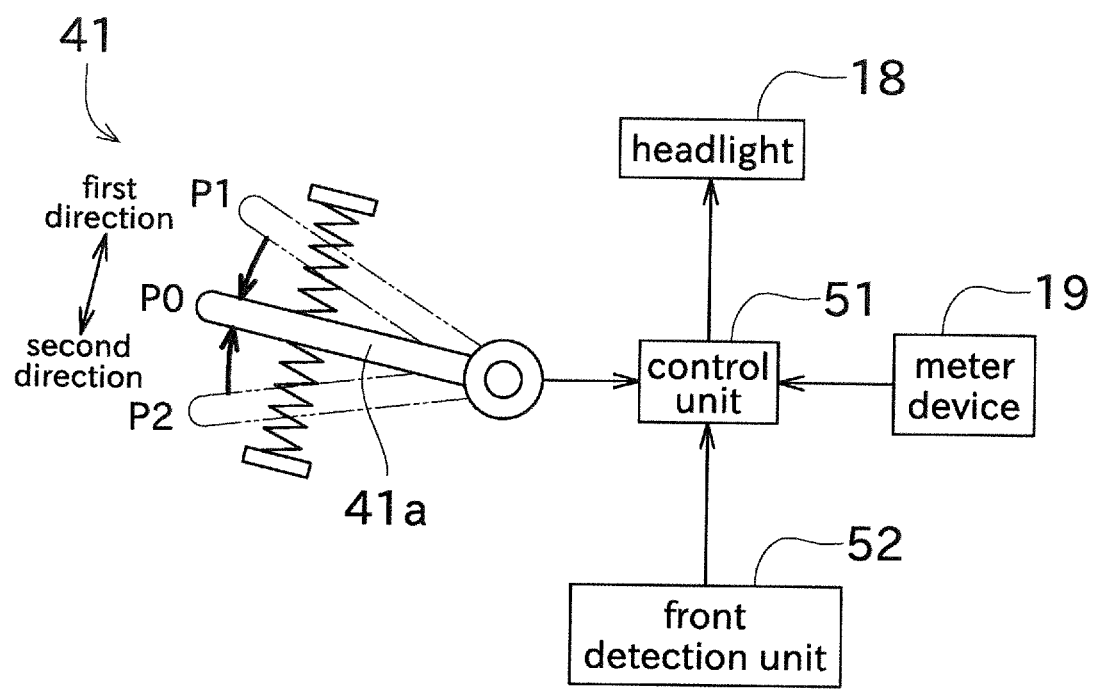
FIG. 3 is a block diagram showing an electric configuration related to switching modes of a headlight.

Next, referring to FIGS. 3 to 5, modes relating to the irradiation of the headlight 18 will be described. In the following, the mode relating to the irradiation of the headlight 18 may simply be referred to as "mode".

The motorcycle 1 of this embodiment can perform three modes: a manual mode, a first auto mode, and a second auto mode. Hereinafter, the first auto mode and the second auto mode may be referred to simply as "the auto mode". The motorcycle 1 includes a front detection assembly 50 as a configuration for performing these modes. The front detection assembly 50 has a configuration in which a control unit 51 and a front detection unit 52 are integrated with each other. In other words, the front detection unit 50 (the control unit 51 and the front detection unit 52) is, for example, mounted on a single housing and is integrally movable. The control unit 51 and the front detection unit 52 may be disposed separately.

The control unit 51 includes processing unit such as a CPU and a storage unit such as a flash memory. The control unit 51 controls the headlight 18. In particular, the control unit 51 controls the unit for energizing the headlight 18. As a result, the control unit 51 can switch between a state in which the headlight 18 irradiates the high beam and a state in which the headlight 18 irradiates the low beam. Further, the control unit 51 can perform control for performing the above three modes and control for switching the modes. The control unit 51 may be configured to control only the headlight 18. The control unit 51 may be configured to perform other controls. The control unit 51 may be a part of the meter device 19, for example. That is, the control unit 51 may be configured to perform control relating to displaying of the meter device 19 and control according to operations of the handle switch 34.

The front detection unit 52 is provided at the front of the motorcycle 1 as shown in FIG. 2. The front detection unit 52 is, for example, a camera for capturing a front image. The image acquired by the front detection unit 52 is outputted to the control unit 51. The control unit 51 analyzes the image acquired by the front detection unit 52, and detects, for example, a position of a foregoing vehicle, a position of an oncoming vehicle, and ambient brightness. The position of the foregoing vehicle can be detected, for example, based on a position of a tail light of the foregoing vehicle. The position of the oncoming vehicle can be detected on the basis of a position of a headlight of the oncoming vehicle or a road surface irradiated with the headlight. The front detection unit 52 is not limited to camera, and may be an ultrasonic sensor or a radar device. The front detection unit 52 may be a sensor that detects not an image but only brightness. The control unit 51 controls the headlight 18 on the basis of the information detected by using the front detection unit 52 during the auto mode.

The front detecting unit 50 of this embodiment is disposed at a position covered with the wind shield 23 (more specifically, at the rear of the wind shield 23). As described above, since the wind shield 23 can transmit visible light, the front detection unit 52 as a camera can acquire a front image through the wind shield 23.

The front detection unit 52 may be disposed inside of the cowling 22. Since the cowling 22 does not transmit visible light, it is preferable that an opening is formed on the cowling 22, and the front detection unit 52 as a camera acquires the front image through the opening. The opening of the cowling 22 may be covered with a visible-light transmissive member. The front detection unit 52 is not limited to the above-described example, and may be disposed at a position other than the above-described example as long as it can acquire the front data.

Hereinafter, three modes that can be performed by the motorcycle 1 will be described. The manual mode is a mode in which driver operates the light operation part 41 to switch between a state in which the headlight 18 irradiates the low beam and a state in which the headlight 18 irradiates the high beam.

The first auto mode is a mode in which the control unit 51 automatically switches between the low beam and the high beam of the headlight 18 according to the surrounding conditions. For example, the control unit 51 normally irradiates the high beam as shown in FIG. 4 and switches to the low beam when the distance to an oncoming vehicle 100 is closer than a threshold. Accordingly, a driver of the oncoming vehicle 100 less dazzling. The control unit 51 also makes the headlight 18 irradiate the low beam when the distance to a foregoing vehicle is closer than a threshold value. However, if the control unit 51 determines that the motorcycle 1 is traveling in a bright place such as an urban area, the control unit 51 makes the headlight 18 irradiate the low beam even when the oncoming vehicle 100 or the foregoing vehicle cannot be detected. This is because the high beam is not required in bright ambient conditions. In addition, there are a lot of other vehicles and pedestrians in bright ambient conditions. Therefore, irradiating the low beam can reduce the possibility of dazzling other drivers or pedestrians. The conditions for switching between the high beam and the low beam in the first auto mode are examples, and other conditions such as the vehicle speed may be set.

The second auto mode is a mode in which the control unit 51 automatically adjusts the irradiation range of the high beam according to the surrounding condition. For example, the control unit 51 normally irradiates the high beam, as shown in FIG. 5, and makes the headlight 18 irradiate the high beam so as to avoid the location where an oncoming vehicle 100 is positioned when range to the oncoming vehicle 100 is closer than a thresholds. As a result, a driver of the oncoming vehicle 100 is hardly dazzled while ensuring a far field of view. There are various structures for adjusting the irradiation range of the high beam, for example, a following structure can be adopted. That is, the headlight 18 includes a plurality of light sources, and the light sources corresponding to an area determined not to irradiate the high beam is turned off. Alternatively, the irradiation area of the high beam may be adjusted by covering a part of the light source of the high beam corresponding to an area determined not to be irradiated the high beam. The control unit 51 makes the headlight 18 irradiate the high beam so as to avoid the foregoing vehicle even when the distance to the foregoing vehicle is closer than a threshold value. In the second auto mode, since the irradiation area can be adjusted, the headlight 18 basically irradiates the high beam, but when a predetermined condition is satisfied, the control part 51 controls the headlight 18 so that the headlight 18 irradiates the low beam.

Next, in the first auto mode and the second auto mode, control that can be performed by the control unit 51 based on the configuration specific to the motorcycle 1 will be described. The control described below may be omitted.

The headlight 18 of the motorcycle 1 is configured to be irradiate at all times. Drivers may wish to change the modes related to the irradiation of the headlight 18, depending on day or night. The control unit 51 may perform the predetermined mode when it is determined that it is in daytime or nighttime now based on, for example, at least one of time and ambient brightness. When the control unit 51 has switched modes by specifying that it is in the daytime now, it is preferable to indicate this on the meter device 19.

The meter device 19 of the motorcycle 1 is exposed to the outside of the vehicle body. Therefore, in order to ensure proper visibility of the meter device 19 in both in daytime and nighttime, the control unit 51 changes the brightness, the displayed colors, and the like of the meter device 19 based on the detected result of the ambient brightness. A typical motorcycle includes a dedicated optical sensor for detecting ambient brightness. In this regard, the motorcycle 1 of this embodiment includes the front detection unit 52. If the front detection unit 52 is capable of detecting ambient brightness, such as cameras, the brightness and displayed colors of the meter device 19 may be changed based on the detected result of the front detection unit 52. This eliminates the need for a dedicated sensor for changing the brightness, displayed colors, and the like of the meter device 19.

The motorcycle 1 turns by inclining the vehicle body 10 inward in the turning direction so as to rotate about an axle extending in the front-rear direction (vehicle length direction). When the vehicle body 10 inclines, the data detected by the front detection unit 52 also changes. For example, if the front detection unit 52 is a camera, a tilted image is acquired. Therefore, the control unit 51 corrects the information changed by the inclination of the vehicle body 10 to detect the surrounding information. For example, when the image changes due to the inclination of the vehicle body 10, the object included in the image rotates uniformly. This enables the control part 51 to determine whether the vehicle body 10 is inclined or not and to detect the degree of the inclination or the like. Therefore, by performing the correction to cancel the influence of the inclination of the vehicle body 10, it is possible to detect the surrounding condition. Alternatively, the motorcycle 1 may include an inclination sensor and may correct the data detected by the front detection unit 52 based on the data detected by the inclination sensor. The inclination sensor is a sensor for detecting an inclination angle (so called bank angle) of the motorcycle 1 in which the rotation angle is the front-rear direction.

When the vehicle body 10 is inclined, the height of the headlight 18 is lowered and the orientation of the headlight 18 is also changed. For that reason, depending on the inclination angle of the car body 10, the irradiation range of the headlight 18 (the distance of the irradiation direction and the horizontal spread) also changes. Therefore, the inclination angle of the vehicle body 10 may be used for determining whether to irradiate the low beam or the high beam in the first auto mode. In the second auto mode, the inclination angle of the vehicle body 10 may be used for determining the high beam radiation area.

Figure 6:
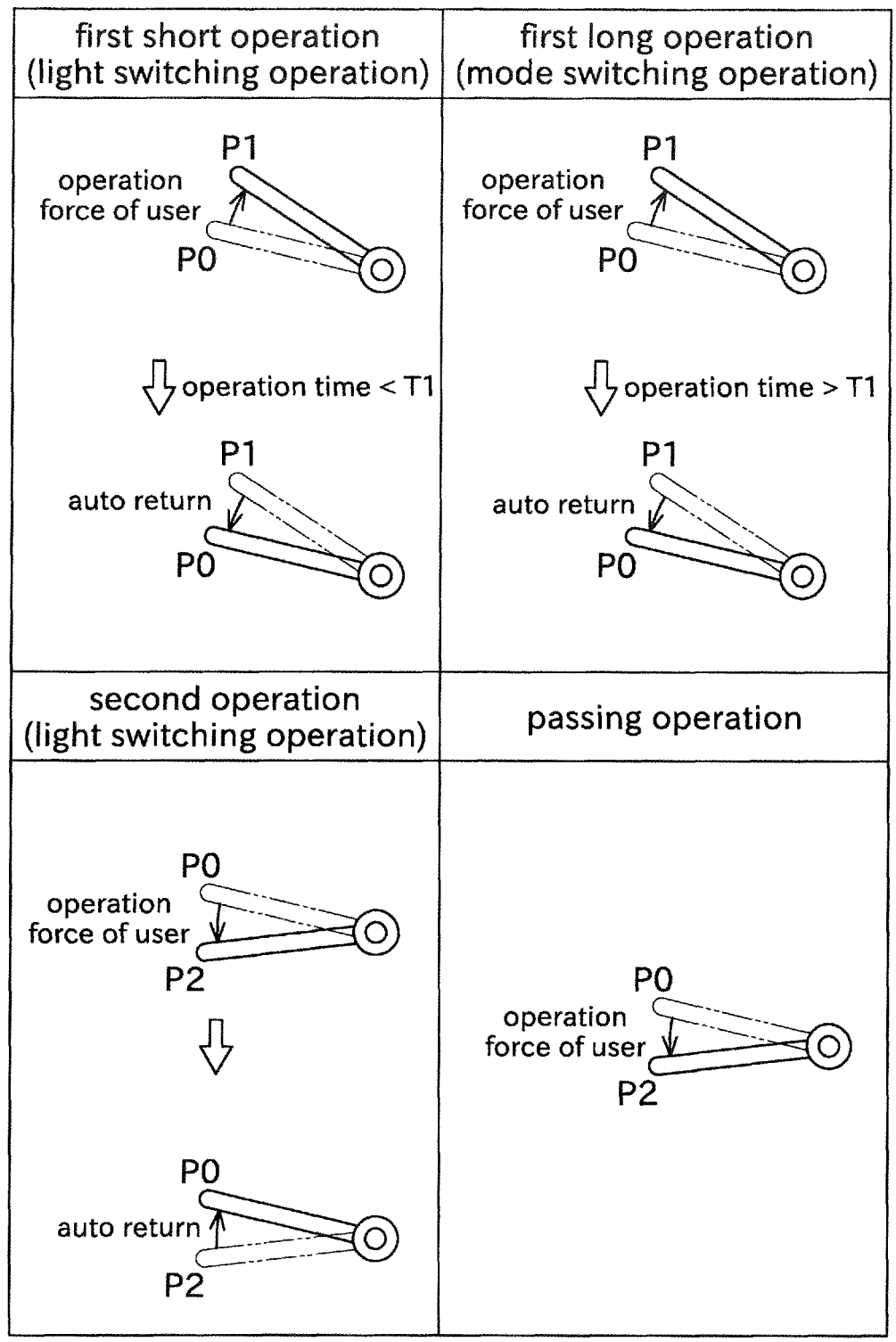
FIG. 6 is a diagram explaining operations performed by using an operation element.

Referring now to FIGS. 6 and 7, operations performed by the driver with respect to irradiating the headlight 18 will be described. Hereinafter, an operation for switching the high beam and the low beam at the time of the manual mode is referred to as "light switching operation", an operation for performing passing is referred to as "passing operation", and an operation for switching modes is referred to as "mode switching operation". The light switching operation, the passing operation and the mode switching operation are different operations. However, a part of each of the operations may be common.

In this embodiment, all of the light switching operation, the passing operation and the mode switching operation can be performed using the return lever 41a of the light operation part 41. As shown in FIG. 3, the return lever 41a is configured to be movable in a first direction and a second direction. Thus, the return lever 41*a* can switch positions between a first position P1 positioned toward the first direction from a neutral position P0, the neutral position P0, and a second position P2 positioned toward the second direction from the neutral position P0.

A detector (not shown) is disposed on the base end of the return lever 41*a*. The detector transmit signals to the control unit 51 depending on whether the return lever 41*a* is positioned in the neutral position P0, the first position P1, or the second position P2. As shown in FIG. 3, an energizing member such as a spring for energizing the return lever 41*a* toward the neutral position P0 is attached to the return lever 41*a*. With this configuration, the return lever 41*a* returns to the neutral position P0 when operation force by the driver is not applied. In other words, the return lever 41*a* is an auto-return type operation element.

First, the light switching operation will be described. There are two types of the light switching operation such as an operation for changing into a state in which the high beam is irradiated in the manual mode and an operation for changing into a state in which the low beam is irradiated in the manual mode. Hereinafter, a specific description will be given.

In order to be the state in which the high beam is irradiated in the manual mode, a first short operation (light switching operation) shown in FIG. 6 is performed. The first short operation is as follows. That is, the driver applies the operation force in the first direction to the return lever 41*a* so that the return lever 41*a* is positioned at the first position P1. After that, the driver releases the operation force prior to exceeding the threshold time TI so that the return lever 41*a* returns to the neutral position P0. In the following explanation, the time when the return lever 41*a* is positioned at the first position P1 or the second position P2 away from the neutral position P0 is referred to as "operation time". The control part 51 begins to count the operation time at the moment when the return lever 41*a* leaves the neutral position P0. Alternatively, the counting of the operation time may be started when the return lever 41*a* reaches the first position P1 or the second position P2.

Here, the direction in which the return lever 41*a* is moved in order to manually irradiate the high beam is defined as the first direction. The first direction of this embodiment is a direction in which components include at least one of a forward direction and an upward direction. The high beam is irradiated ahead of the low beam and is above the low beam. Thus, there is a relationship between the first direction and the high beam. This is therefore intuitive to driver.

The control unit 51 can detect where the return lever 41*a* is positioned. Therefore, it is possible to determine whether or not the first short operation is performed. As shown in FIG. 7, when it is determined that the first short operation (the light switching operation to the high beam) has been performed, the control unit 51 switches to the state in which the high beam is irradiated in the manual mode regardless of the present mode.

In order to be the state in which the low beam is irradiated in the manual mode, a second operation (light switching operation) shown in FIG. 6 is performed. The second operation is as follows. That is, the driver applies the operation force in the second direction to the return lever 41*a* so that the return lever 41*a* is positioned at the second position P2. After that, the driver releases the operation force so that the return lever 41*a* returns to the neutral position P0. In this embodiment, since the operation in the second direction is not distinguished from a long operation and a short operation, condition for the operation time is not set.

Here, the direction in which the return lever 41*a* is moved in order to manually irradiate the low beam is defined as the second direction. The second direction is opposite to the first direction. The second direction of embodiment is a direction in which the components include at least one of a rear direction and a lower direction. Thus, there is a relationship between the second orientation and the low beam. This is therefore intuitive to driver.

If it is determined that the second operation has been performed, the control unit 51 switches to the state in which the low beam is irradiated in the manual mode regardless of the present mode.

Next, the passing operation will be described. The passing is the irradiation of the high beam temporarily (instantaneously) during the irradiation of the low beam. In order to perform the passing, the passing operation shown in FIG. 6 is performed. The passing operation is an operation of temporarily (instantaneously) applying the operation force in the second direction to the return lever 41*a* positioned at the neutral position P0 so that the return lever 41*a* is temporarily (instantaneously) positioned at the second position P2.

The control unit 51 make the headlight 18 temporarily irradiate the high beam when the passing operation is performed. Specifically, the control unit 51 make the headlight 18 irradiate the high beam only while the return lever 41*a* is positioned at the second position P2, and irradiate the low beam when the return lever 41*a* returns to the neutral position P0 away from the second position P2. The reason why the low beam is irradiated is that the control unit 51 determines that the second operation is performed because the return lever 41*a* moves from the neutral position P0 to the second position P2 and return the neutral position P0. In other words, when the passing operation is performed, the state is switched to a state in which the low beam is manually irradiated thereafter.

Next, the mode switching operation will be described. The motorcycle 1 of this embodiment can perform the three modes, in order to switch the modes between these three modes, a first long operation (mode switching operation) shown in FIG. 6 is performed. The first long operation is as follows. That is, the driver applies the operation force in the first direction to the return lever 41*a* so that the return lever 41*a* is positioned at the first position P1. After that, the driver releases the operation force after exceeding the threshold time TI so that the return lever 41*a* returns to the neutral position P0.

Thus, the operation time differs between the first short operation and the first long operation. The control unit 51 therefore distinguishes between the light switching operation and the mode switching operation on the basis of the differences of the operation time. Each time the control unit 51 determines that the first long operation is performed, the control unit 51 switches modes among the manual mode, the first auto mode, and the second auto mode in order. In other words, when it is determined that the first long operation is performed, the control unit 51 performs a process of switching from the manual mode to the auto mode, a process of switching modes among a plurality of the auto modes, or a process of switching from the auto mode to the manual mode.

When the auto mode is switched to the manual mode by the mode switching operation, the control unit 51 may be switched to a state in which the high beam is irradiated in the manual mode. Alternatively, the control unit 51 may be switched to the state in which the low beam is irradiated in the manual mode. For example, when the first auto mode is switched to the manual mode, the beam irradiated immediately before the switching in the first auto mode may be continuously irradiated. Alternatively, it may be possible to preset which of the high beam and the low beam is irradiated immediately after switching from the auto mode to the manual mode, for example, by operating the meter device 19. Alternatively, the control unit 51 may determine the surrounding conditions and decide whether to irradiate the high beam or the low beam immediately after switching from the auto mode to the manual mode. That is, the control unit 51 switches to the state in which the high beam is irradiated in the manual mode when it is determined that an oncoming vehicle and a foregoing vehicle are not close to the motorcycle 1 based on the detected result of the front detection unit 52 (i.e., when the irradiation condition of the high beam of the first auto mode is satisfied). The control unit 51 switches to the state in which the low beam is irradiated in the manual mode when it is not satisfied (i.e., when the irradiation condition of the high beam of the first embodiment is not satisfied).

When the mode is switched, the control unit 51 displays the mode after switched on the meter device 19. The meter device 19 may be configured to constantly display the currently modes. The meter device 19 may have a configuration in which the mode after switching is displayed only when the mode is switched.

Next, advantages of the first long operation as a mode switching operation will be described.

Unlike an automobile (four-wheeled vehicle) or the like having a steering wheel, a vehicle having a handle bar 31 as in the motorcycle 1 has a limited space for attaching the operation element such as levers and buttons. In the vehicle including the handle bar 31, since the left and right grips 32 need to be basically grasped by both hands during traveling, it is not preferable to attach the operation element at a position far from the grips 32. In particular, in recent years, the operation element tends to be added because functions provided in the motorcycle 1 are increased. Therefore, if an operation element dedicated to mode switching is provided in the handle switch 34, the installation of another the operation element is restricted. In this respect, by setting "the first long operation" of the return lever 41a to the mode switching operation, mode switching can be realized without providing an operation element dedicated to mode switching.

In the conventional motorcycle not having the auto mode, the light switching operation is generally "the first short operation" or is an operation of switching the position of the switch. For this reason, it is difficult to give a sense of discomfort to driver by setting the light switching operation to "the first short operation". In addition, since there is a possibility that the high beam and the low beam are frequently switched depending on the surrounding conditions in the manual mode, it is preferable that the light switching operation is "the first short operation" whose operation time is short and can be quickly responded to. the mode switching operation is "the first long operation" in which the operation time is longer than the first short operation and driver's intention to operate can be confirmed with certainty. If the mode switching operation is set to "the first short operation", the modes may be switched against driver's operating intention due to the short the operation time. Thus, the mode switching operation is preferably "the first long operation".

The mode switching operation of this embodiment is an operation in the first direction. In the auto modes, the high beam is basically irradiated and suppressing the irradiation under a certain condition. Therefore, by operating the mode switching operation in the first direction (the direction for irradiating the high beam with the manual mode), it is easy for driver to intuitively grasp the mode switching operation. If the mode switching operation is operated in the second direction, it is determined that the passing operation has been performed while the return lever 41a is positioned at the second position P2 in order to perform the mode switching operation, so that the high beam can be irradiated. It is not preferable that the high beam is irradiated for a period of time equal to or longer than the threshold time TI at the time of mode switching. It is therefore preferred that the mode switching operation is the operation of the first direction.

Figure 8:
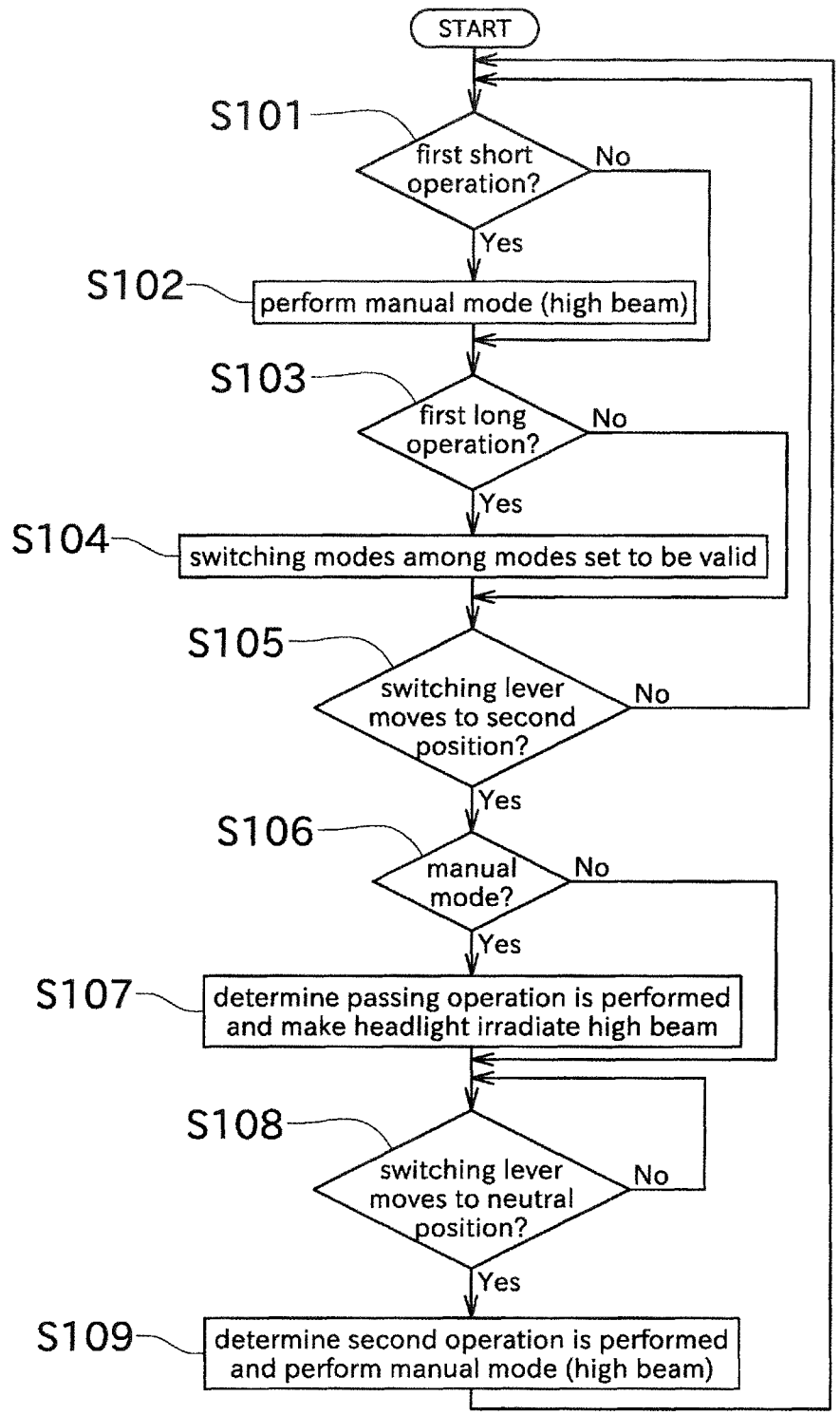
FIG. 8 is a flowchart showing processes related to switching modes of the headlight.

Next, referring to FIG. 8, the flow of processes related to the switching of the modes of the headlight 18 will be briefly described. The flowchart shown in FIG. 8 is an example, and another process may be added, process order may be changed, or some processes may be omitted.

When the control unit 51 determines that the first short operation is performed (S101), the control unit 51 perform the manual mode and make headlight 18 irradiate the high beam (S102). When the control unit 51 determines that the first long operation is performed (S103), the control unit 51 switches the mode among the modes set as valid (S104).

Here, in this embodiment, part of the second operation duplicates with the passing operation. Therefore, for example, when the second operation is performed in a situation where the low beam is irradiated during the first auto mode, the control unit 51 determines that the passing operation is performed because the return lever 41a is temporarily positioned at the second position P2. And then the control unit 51 make headlight 18 temporarily irradiate the high beam. That is, the high beam is temporarily irradiated in a situation where, for example, an oncoming vehicle or a foregoing vehicle may be nearby.

To prevent this, the control unit 51 of in this embodiment switches to the manual mode without irradiating the high beam when the second operation is performed during the auto mode. Specifically, when the control unit 51 determines that the return lever 41a moves to the second position P2 (S105), the control unit 51 determines whether or not the manual mode is in progress (S106). If the manual mode is in progress, it can be presumed that the passing operation is performed, then the control unit 51 make headlight 18 irradiate the high beam while the return lever 41a is positioned at the second position P2. On the other hand, if the manual mode is not in progress (i.e., in the auto mode), the control unit 51 does not make the headlight 18 irradiate the high beam even if the return lever 41a is positioned at the second position P2.

Thereafter, when the control unit 51 determines that the return lever 41a moves to the neutral position P0 regardless of the manual mode or the auto mode (S108), the control unit 51 determines that the second operation is performed and switches to the state in which the low is irradiated in the manual mode (S109). By performing this control, the high beam is not temporarily irradiated when the mode is switched to the manual mode by the second operation.

Next, referring to FIG. 9, setting process of valid and invalid modes of the motorcycle 1 of this embodiment will be described.

The motorcycle 1 has three modes, but depending on a driver, one of these modes may not be necessary. For example, if the first auto mode is not necessary, then the mode switching operation needs to be performed twice when switching from the manual mode to the second auto mode. Therefore, some effort is needed for driver.

To reduce this effort, the motorcycle 1 of this embodiment allows three modes to be valid and invalid in advance. Specifically, the driver can set the validity or invalidity of the respective modes by displaying a setting screen on the meter device 19, for example, by operating the operation part of the meter device 19 prior to traveling. The control unit 51 performs a process of switching the mode so that the mode is not switched to the mode set as invalid. The driver may operate the handle switch 34, and the handle switch 34 transfers the instruction to the meter device 19. Another device Instead of the meter device 19 may be capable of setting validity or invalidity of the modes.

FIG. 9 shows changing mode when each of the operations is performed in the situation where the first auto mode is invalidated. As shown in FIG. 9, when control unit 51 determines that the first long operation is performed during the manual mode, the control unit 51 switches from the manual mode to the second auto mode. Thus, the mode is switched to the second auto mode by only performing the first long operation once. As shown in (a) of FIG. 9, each time the control unit 51 determines that the first long operation is performed, the control unit 51 switches modes between the manual mode and the second auto mode.

If the first auto mode is invalid, the number of the valid auto mode is one. In the situation, switching between the auto modes does not occur. Therefore, as shown in (b) of FIG. 9, even when the control unit 51 determines that the first long operation is performed during the second auto mode, the control unit 51 may maintain the second auto mode (the same auto mode) without switching to the manual mode. This enable to perform the desired auto mode even when the driver does not know the present mode and hard to confirm the display of the meter device 19.

In a situation where the second auto mode is invalid, the control unit 51 switches modes between the manual mode and the first auto mode each time the control unit 51 determines that the first long operation is performed. Also, in a situation where the manual mode is invalid, the control unit 51 switches modes between the first auto mode and the second auto mode each time the control unit 51 determines that the first long operation has is performed.

The operations shown in the first embodiment and the process of the control unit 51 are examples, and can be changed, for example, as follows.

In the first embodiment, when the return lever 41a is positioned at the first position P1 (or the second position P2) and returns to the neutral position P0, the control unit 51 determines that the first short operation or the first long operation (or the second operation) is performed after the return lever 41a returns to the neutral position P0. Alternatively, the control unit 51 may determine that each of the operations is performed when the return lever 41a reaches the first position P1 or the second position P2 (with respect to the first long operation, the timing of exceeding the threshold time TI).

In the first embodiment, if the control unit 51 determines that the light switching operation (the first short operation, the second operation) is performed during the auto mode, the control unit 51 perform the manual mode. Alternatively, the control unit 51 may not switch the manual mode even when the light switching operation is performed during the auto mode. In other words, the mode switching operation (first the first long operation) may also be required to switch from the auto modes to the manual mode. This makes it difficult for driver's hand to erroneously touch the return lever 41a and switch to the manual mode. In a situation where the oncoming vehicle or the like is present in the periphery during the first auto mode, after the driver performs the passing operation, the mode does not switch to the manual mode. Therefore, passing can be performed while the auto mode is continued.

In the first embodiment, the length of the second operation is not distinguished, but the length of the second operation may be distinguished and different functions may be assigned. The functions to be assigned are various, for example, the first auto mode may be performed when the first long operation is performed, and the second auto mode may be performed when the second long operation is performed. In this manner, the number of the mode switching operations is not limited to one but may be plural.

In the first embodiment, the mode switching operation is the first long operation, but may be any of the first short operation, the second operation (the second short operation, the second long operation). The mode switching operation may be an operation in which the driver moves the return lever 41a in the first direction in a predetermined time (e.g., one second) at a predetermined number of times (e.g., twice). The mode switching operation may be an operation in which the driver moves the return lever 41a at the first position P1 and then the driver returns the return lever 41a to the second position P2 within a predetermined time period.

In the first embodiment, the operation element for operating the light switching operation, the passing operation and the mode switching operation is common, but the operation element for operating the passing operation may be different from the operation element for operating the other two operations. With this configuration, unintentional the high beam irradiation during the mode switching operation can be easily prevented.

The shapes and configurations of the return lever 41a of the first embodiment are examples and may be changed. For example, the return lever 41a may include two auto-return type buttons. The return lever 41a may be an operation element that is configured to be slided linearly.

Figure 10:
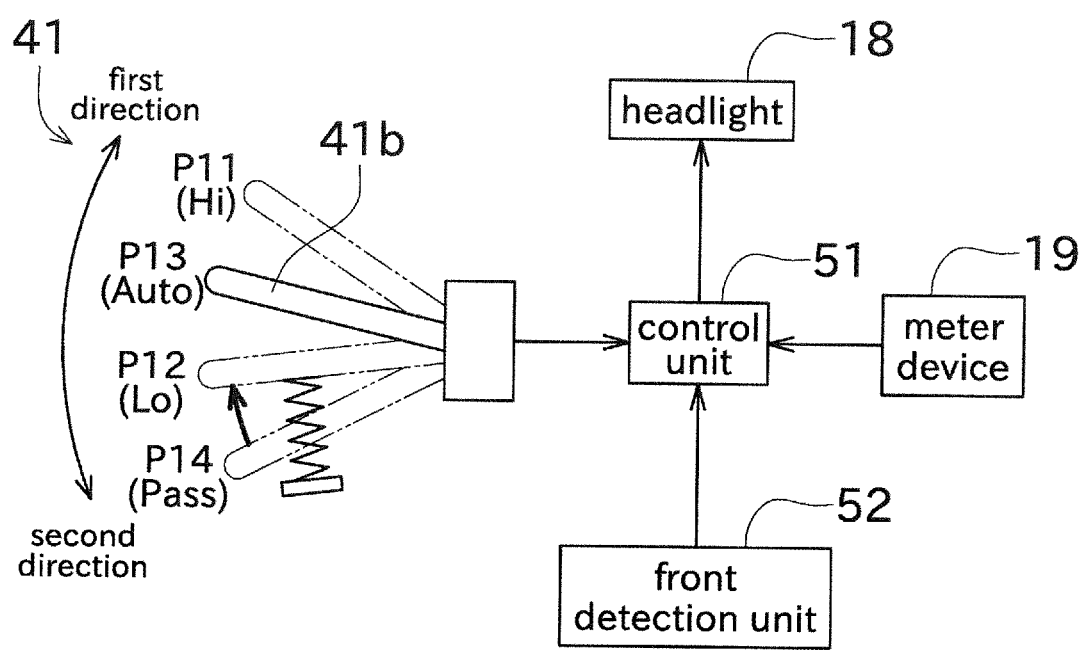
FIG. 10 is a block diagram showing an electric configuration of a motorcycle of a second embodiment.

Next, referring to FIG. 10, the second embodiment will be described. FIG. 10 is a block diagram showing an electric configuration of the motorcycle 1 of the second embodiment.

In the second embodiment, the configuration of the light operation part 41 differs from that of the first embodiment. The light operation part 41 of the second embodiment is composed of a switching lever 41b (operation element) shown in FIG. 10. The switching lever 41b can be positioned at a first manual position P11, a second manual position P12, an auto position P13, and a passing position P14. The switching lever 41b can keep positioning the first manual position P11, the second manual position P12, and the auto position P13 even if operation force of a driver is not applied. The switching lever 41b is provided with an energizing member such as a spring for biasing the switching lever 41b at the passing position P14 to the second manual position P12. With this configuration, the return lever 41a returns to the second manual position P12 when the operation force of the driver is not applied while being positioned at the passing position P14.

Switches (not shown) are arranged on the base end of the switching lever 41b, and signals differing depending on the position of the switching lever 41b are transmitted to the control unit 51. Thus, the control unit 51 can detect where the switching lever 41b is positioned.

In the second embodiment, the modes are determined according to the position of the switching lever 41*b*. When the control unit 51 determines that the switching lever 41*b* is positioned at the first manual position P11, the control unit 51 performs the manual mode and the high beam is irradiated. When the control unit 51 determines that the switching lever 41*b* is positioned at the second manual position P12, the control unit 51 performs the manual mode and the low beam is irradiated. If the control unit 51 determines that the switching lever 41*b* is positioned at the auto position P13, the control unit 51 performs the auto mode. Which of the first auto mode and the second auto mode is performed is set in advance by operating the meter device 19 or the like. While the control unit 51 determines that the switching lever 41*b* is positioned at the passing position P14, the high beam is irradiated.

Also in the second embodiment, all of the light switching operation, the mode switching operation and the passing operation can be performed by using only the switching lever 41*b* and, in other words, by simply moving the switching lever 41*b* in the first direction or the second direction.

In the second embodiment, the first manual position P11, the auto position P13, the second manual position P12, and the passing position P14 are arranged in this order from the one end of the first direction. In this arrangement, the driver can always position the switching lever 41*b* to end of the first direction when the driver wish the irradiation of the high beam, and the driver can position the switching lever 41*b* to end of the second direction when the driver wish the irradiation of the low beam. Therefore, it is easy for the driver to select intuitively the operation. In order to position the switching lever 41*b* at the auto position P13, which is in intermediate position, adjustments of the operating force may be required depending on the device configuration. Since a situation in which the manual mode and the auto mode are frequently changed is rare, it is preferable to set the auto position P13 to an intermediate position.

The light operation part 41 of the first embodiment requires the first long operation when switching from the manual mode to the auto mode, whereas the light operation part 41 of the second embodiment does not require the long operation. Therefore, switching can be performed in a short time.

The passing operation is preferably performed by an auto-return type the operation element because of its characteristics. In this respect, as in the case of the switching lever 41*b*, by enabling the auto return only at a part of the position, three operations can be performed by using one operation element even in the light operation part 41 of the second embodiment.

The operations shown in the second embodiment and the process of the control unit 51 are examples, and can be changed, for example, as follows.

The auto position P13 may be the most end position of the first direction. When the high beam and the low beam are switched in the manual mode, the switching lever 41*b* can be moved less distance.

The number of the auto position P13 may be two. In that case, If the control unit 51 detects that the switching lever 41*b* is positioned in the first auto position P13, the control unit 51 performs the first auto mode. In that case, If the control unit 51 detects that the switching lever 41*b* is positioned in the second auto position P13, the control unit 51 performs the second auto mode.

The operation element for performing the passing operation may be different from the operation element for performing the other two operations, as variations of the first embodiment have also been described. With this configuration, passing can be performed without changing the mode. The shapes and operating methods of the switching lever 41*b* can also be changed as appropriate.

Figure 11:
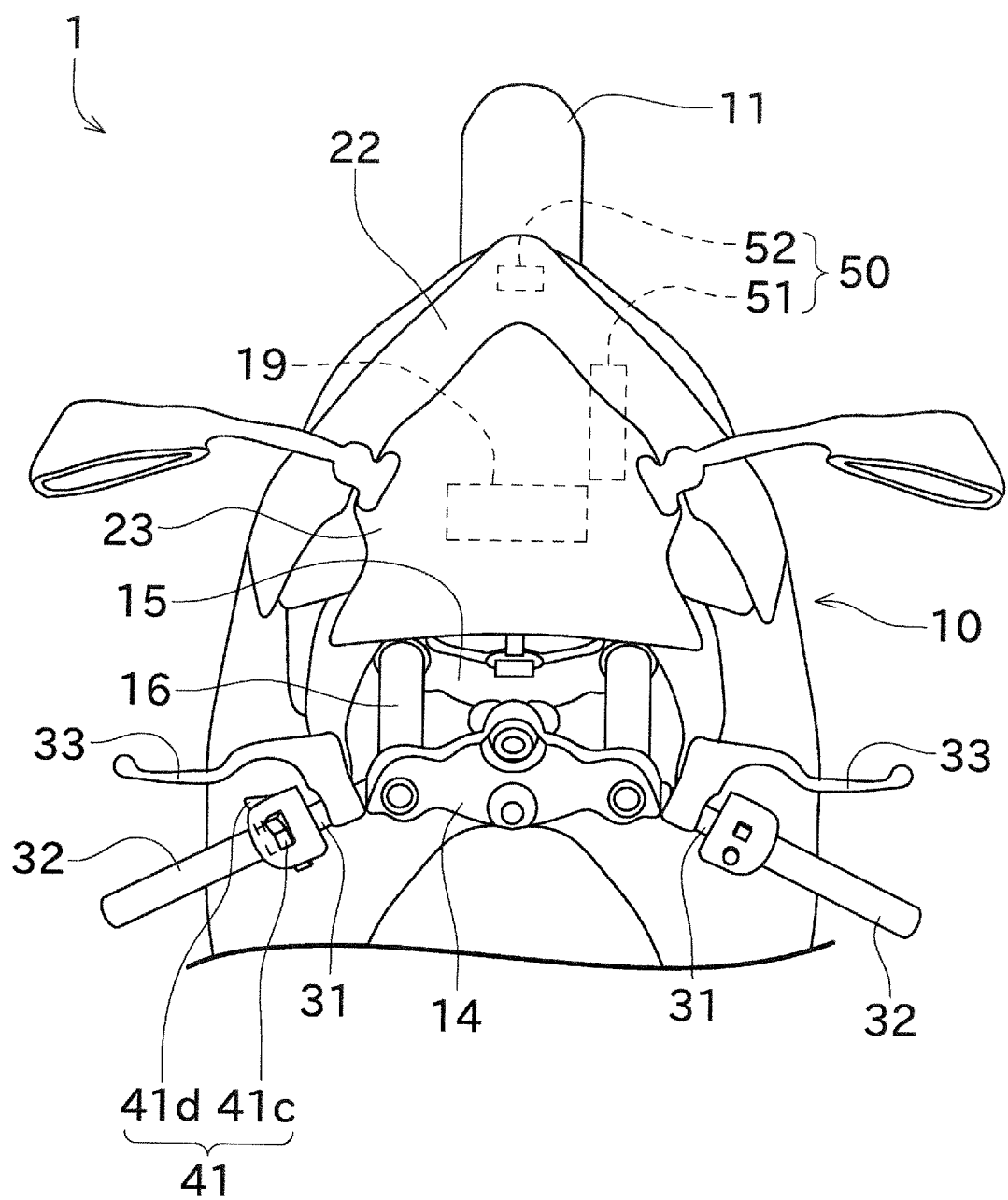
FIG. 11 is a front plan view of a motorcycle of a third embodiment.

Next, referring to FIG. 11, the third embodiment will be described. FIG. 11 is a plan view of the front part of the motorcycle 1 of the third embodiment.

In the first embodiment and the second embodiments, there is one the operation element constituting the light operation part 41. On the other hand, in the third embodiment, there are two operation elements (a switching button 41*c* and a passing button 41*d*) constituting the light operation part 41.

The switching button 41*c* is an operation element in which either the high beam side (front side) or the low beam side (rear side) is in a pressed state. The control unit 51 make the headlight 18 irradiate the high beam while detecting that the high beam side is in the pressed state during the manual mode. In addition, the control unit 51 makes the headlight 18 irradiate the low beam. while detecting that the low beam side is in the pressed state during the manual mode state. The control unit 51 make the headlight 18 irradiate the high beam while the control unit 51 detects that the passing button 41*d* is pressed in the manual mode. As described above, since both the switching button 41*c* and the passing button 41*d* are members for performing operations related to irradiating the headlight 18, the switching button 41*c* and the passing button 41*d* together correspond to the light operation part 41.

In the third embodiment, when detecting that the switching button 41*c* is switched from the low beam side to the high beam side while the passing button 41*d* is pressed, the control unit 51 switches from the manual mode to the auto mode. On the other hand, when the control unit 51 detects that the switching button 41*c* is switched from the high beam side to the low beam side while the passing button 41*d* is pressed during the auto mode, the control unit 51 switches from the auto mode to the manual mode.

In the third embodiment, there are a plurality of the operation element constituting the light operation part 41, and an operation in which a plurality of the operation element operations are combined corresponds to the mode switching operation. A difference operation other than the third embodiment may be the mode switching operation.

As described above, the motorcycle 1 includes the handle bar 31, the light operation part 41, and the control unit 51. The light operation part 41 is provided to the handle bar 31. During the manual mode of manually switching between low beam and high beam of the headlight 18, the light switching operation 41 for switching between irradiating the low beam or irradiating the high beam can be performed using the light operation part 41. The passing operation for temporarily switching the low beam to the high beam may be performed using the light operation part 41. The control unit 51 performs at least two modes among the manual mode, the first auto mode which is a mode for automatically switching between the low beam and the high beam, and the second auto mode which is a mode for automatically adjusting an irradiation area of the high beam. The control unit 51 switches the modes including at least two modes among the manual mode, the first auto mode, and the second auto mode when the control unit 51 determines that the mode switching operation which is different from the light switching operation and the passing operation is performed using the light operation part 41.

Accordingly, modes related to the irradiation of the headlight 18 can be switched by using the light operation part 41.

Therefore, compared with a configuration in which an operation element for switching modes is separately provided, the number of the operation elements arranged in the handle bar 31 can be reduced. In particular, since the motorcycle 1 including the handle bar 31 has a limited space for disposing the operation element, the above-mentioned effects can be more effectively exhibited.

In the motorcycle 1 of the first and second embodiments, the light operation part 41 includes at least one the operation element (the return lever 41a or the switching lever 41b). The light switching operation includes the operation of moving the operation element in the first direction while irradiating the low beam in the manual mode to switch to the high beam and the operation of moving the operation element in the second direction while irradiating the high beam in the manual mode to switch to the low beam. The mode switching operation includes moving the operation element in the first direction or the second direction.

Thus, the operation element used in the light switching operation and the mode switching operation are common, and the operating directions of the operation element are also common. It is therefore possible to simplify the operation of the driver and to adopt the operation element of simple construction.

In the motorcycle 1 of the first and second embodiments, the control unit 51 switches to the manual mode and make the headlight irradiate the high beam when the control unit determines that the light switching operation in the first direction is performed during the first auto mode or the second auto mode The control unit 51 switches to the manual mode and make the headlight 18 irradiate the low beam when the control unit determines that the light switching operation in the second direction is performed during the first auto mode or the second auto mode.

As a result, the same situation (specifically, the manual mode and irradiating the high beam or the low beam) is realized by the control unit 51 by performing the same operations regardless of whether the current status is the manual mode or the auto mode. Therefore, it becomes easy for the driver to intuitively grasp how to operate. Even if the driver does not recognize the present mode, the mode is in the state as intended by driver.

In the motorcycle 1 of the first and second embodiments, the operation element (the return lever 41a) is the auto-return type in which the operation element moves to the first position P1 by applying an operation force in the first direction and moves to a second position P2 by applying the operation force in the second direction, and in which the operation element returns to the neutral position P0 by releasing the operation forces The control unit 51 distinguishes between the light switching operation and the mode switching operation based on the operation time at which the operation element is positioned at the first position P1 or the second position P2 away from the neutral position P0.

Thus, by distinguishing between the first short operation and the first long operation operations in the auto-return type, the driver can easily perform a desired operation without being aware of the present position of the operation element. Further, compared with the second embodiment, the position of the operation element does not need to be precisely adjusted, so that even if vibrations occur, desired operations can be easily realized. As described above, the operating system of the motorcycle 1 including the handle bar 31 is suitable.

In the motorcycle 1 of the first embodiment, the control unit 51 determines that the mode switching operation is performed when detecting that the operation time of the operation element (return lever 41a) in the first direction exceeds threshold time. The control unit 51 determines that the passing operation is performed when detecting that the operation element is positioned at the second position P2.

In this manner, by setting the mode switching operation to the first long operation, it is possible to suppress switching of modes against the intent of the driver. In order to avoid duplication with the passing operation, it is preferable that the mode switching operation is operated in the first direction.

In the motorcycle 1 of the first embodiment, the control unit 51 switches to the manual mode without irradiating the high beam when the operation element (return lever 41a) is positioned at the second position P2 and then returns to the neutral position P0 while irradiating the low beam in the first auto mode or the second auto mode.

As a result, it is possible to prevent the high beam from being temporarily irradiated when the manual mode is changed from the auto mode.

In the motorcycle 1 of the first embodiment, the control unit 51 performs all of the manual mode, the first auto mode, and the second auto mode The control unit 51 switches the modes in a predetermined order each time the mode switching operation is performed.

In this manner, by sharing the mode switching operation, it is possible to switch between the three modes while reducing the number of the operation element, the number of sensors for detecting operations, and the like.

In the motorcycle 1 of the second embodiment, the operation element (switching lever 41b) is capable of being positioned at at least three positions among a first manual position, a second manual position, and an auto position. The control unit 51 make the headlight 18 irradiate the high beam in the manual mode when the operation element is positioned at the first manual position P11. The control unit 51 make the headlight 18 irradiate the low beam in the manual mode when the operation element is positioned at the second manual position P12. The control unit 51 performs the first auto mode or the second auto mode when the operation element is positioned at the auto position P13.

This makes it possible to switch modes in a short time since no long operation is required.

In the motorcycle 1 of the second embodiment, the operation element is capable of being positioned at a passing position P14, and the operation element is configured to return to the second manual position P12 by releasing a operation force applied to the operation element which is positioned at the passing position P14. The control unit makes the headlight 18 irradiate the high beam while the operation element is positioned at the passing position P14.

This allows further the passing operation using the same the operation element.

In the motorcycle 1 of the first, second and third embodiments, the meter device 19 is an operation part for setting validity and invalidity of the manual mode, the first auto mode, and the second auto mode The control unit 51 switches the modes among the modes set to be valid by using the meter device 19 when the control unit 51 determines that the mode switching operation is performed.

This makes it possible to prevent the mode unnecessary for the driver from being switched to the invalid mode by selecting beforehand, and to simplify the operations of driver.

Although the preferred embodiment of the present invention has been described above, the above configuration can be modified, for example, as follows.

The motorcycle 1 of the above embodiment is able to perform all three modes, but the motorcycle may be able to perform only two modes (e.g., the manual mode and the first auto mode). The motorcycle 1 may be capable of performing four or more modes.

In the above embodiment, the motorcycle 1 is described as an example of the vehicle including the handle bar 31, but the present invention can also be applied to another vehicle including a handle bar. The number of wheels is not limited to two, and may be three or four or more. An example of a four-wheeled vehicle with a handle bar is an all-terrain vehicle (ATV) primarily for traveling on non-paved areas. The present invention can also be applied to a straddle vehicle other than the motorcycle 1, in which a driver rides over. The present invention can also be applied to a lean type vehicle other than the motorcycle 1, in which a vehicle body is inclined when turning.

What is claimed is:

1. A vehicle comprising:
    a handle bar;
    a light operation part being provided to the handle bar for operating a light switching operation and a passing operation, the light switching operation being an operation for switching between irradiating low beam and irradiating high beam of a headlight in a manual mode which is a mode for manually switching the low beam and the high beam, the passing operation being an operation for temporarily switching from the low beam to the high beam; and
    a control unit performing at least two modes among the manual mode, a first auto mode which is a mode for automatically switching between the low beam and the high beam, and a second auto mode which is a mode for automatically adjusting an irradiation area of the high beam, the control unit switching the modes including at least two modes among the manual mode, the first auto mode, and the second auto mode when determining that a mode switching operation which is different from the light switching operation and the passing operation is performed using the light operation part,
    wherein the light operation part includes at least one operation element permitting an operator to operate the light switching operation, the passing operation, and the mode switching operation, and
    wherein the light switching operation includes an operation of moving the operation element in a first direction while irradiating the low beam in the manual mode to switch to the high beam and an operation of moving the operation element in a second direction while irradiating the high beam in the manual mode to switch to the low beam.

2. The vehicle according to claim 1, wherein
    the control unit switches to the manual mode and make the headlight irradiate the high beam when the control unit determines that the light switching operation in the first direction is performed during the first auto mode or the second auto mode, and
    the control unit switches to the manual mode and make the headlight irradiate the low beam when the control unit determines that the light switching operation in the second direction is performed during the first auto mode or the second auto mode.

3. The vehicle according to claim 2, wherein the first direction is a direction whose components include at least one of a forward direction and an upward direction.

4. The vehicle according to claim 2, wherein the second direction is a direction whose components include at least one of a rear direction and a lower direction.

5. The vehicle according to claim 1, wherein
    the operation element is an auto-return type in which the operation element moves to a first position by applying an operation force in the first direction and moves to a second position by applying an operation force in the second direction, and in which the operation element returns to a neutral position by releasing the operation forces, and
    the control unit distinguishes between the light switching operation and the mode switching operation based on operation time at which the operation element is positioned at the first position or the second position away from the neutral position.

6. The vehicle according to claim 5, wherein
    the control unit determines that the mode switching operation is performed when detecting that the operation time of the operation element in the first direction exceeds threshold time, and
    the control unit determines that the passing operation is performed when detecting that the operation element is positioned at the second position.

7. The vehicle according to claim 6, wherein
    the control unit switches to the manual mode without irradiating the high beam when the operation element is positioned at the second position and then returns to the neutral position while irradiating the low beam in the first auto mode or the second auto mode.

8. The vehicle according to claim 5, wherein
    the control unit performs all of the manual mode, the first auto mode, and the second auto mode, and
    the control unit switches the modes in a predetermined order each time the mode switching operation is performed.

9. The vehicle according to claim 5, wherein an operation time of the mode switching operation is longer than an operation time of the light switching operation.

10. The vehicle according to claim 1, wherein
    the operation element is capable of being positioned at at least three positions among a first manual position, a second manual position, and an auto position,
    the control unit make the headlight irradiate the high beam in the manual mode when the operation element is positioned at the first manual position,
    the control unit make the headlight irradiate the low beam in the manual mode when the operation element is positioned at the second manual position, and
    the control unit performs the first auto mode or the second auto mode when the operation element is positioned at the auto position.

11. The vehicle according to claim 10, wherein
    the operation element is capable of being positioned at a passing position,
    the operation element is configured to return to the second manual position by releasing a operation force applied to the operation element which is positioned at the passing position, and
    the control unit makes the headlight irradiate the high beam when the operation element is positioned at the passing position.

12. A vehicle comprising:
    a handle bar;
    a light operation part being provided to the handle bar for operating a light switching operation and a passing operation, the light switching operation being an operation for switching between irradiating low beam and irradiating high beam of a headlight in a manual mode which is a mode for manually switching the low beam and the high beam, the passing operation being an operation for temporarily switching from the low beam to the high beam;

a control unit performing at least two modes among the manual mode, a first auto mode which is a mode for automatically switching between the low beam and the high beam, and a second auto mode which is a mode for automatically adjusting an irradiation area of the high beam, the control unit switching the modes including at least two modes among the manual mode, the first auto mode, and the second auto mode when determining that a mode switching operation which is different from the light switching operation and the passing operation is performed using the light operation part, wherein the light operation part includes at least one operation element permitting an operator to operate the light switching operation, the passing operation, and the mode switching operation; and a setting operation part being provided separately from the light operation part, wherein the setting operation part is an operation part for setting validity and invalidity of the manual mode, the first auto mode, and the second auto mode, and wherein the control unit switches the modes among the modes set to be valid by using the setting operation part when the control unit determines that the mode switching operation is performed.

* * * * *